(12) United States Patent
Moler et al.

(10) Patent No.: US 6,717,332 B2
(45) Date of Patent: Apr. 6, 2004

(54) APPARATUS HAVING A SUPPORT STRUCTURE AND ACTUATOR

(75) Inventors: Jeff Moler, Sarasota, FL (US); Mark Oudshoorn, Bradenton, FL (US); R. Glenn Akhavein, Bradenton, FL (US); Mark Woozley, Valrico, FL (US); Michael Alexy, Snead Island, FL (US)

(73) Assignee: Viking Technologies, L.C., Sarasota, FL (US)

( * ) Notice: Subject to any disclaimer, the term of this patent is extended or adjusted under 35 U.S.C. 154(b) by 103 days.

(21) Appl. No.: 09/772,273

(22) Filed: Jan. 29, 2001

(65) Prior Publication Data

US 2002/0014813 A1 Feb. 7, 2002

Related U.S. Application Data

(60) Provisional application No. 60/198,056, filed on Apr. 18, 2000, and provisional application No. 60/220,542, filed on Jul. 25, 2000.

(51) Int. Cl.[7] .............................................. H02K 41/08
(52) U.S. Cl. ....................................................... 310/328
(58) Field of Search ................................. 310/328, 348, 310/321, 323.17; H02K 41/08

(56) References Cited

U.S. PATENT DOCUMENTS

| | | | |
|---|---|---|---|
| 3,144,802 A | 8/1964 | Faber et al. | |
| 3,405,289 A | 10/1968 | Gikow | |
| 3,414,779 A | 12/1968 | Bohm | |
| 3,421,109 A | 1/1969 | Wiggins et al. | |
| 3,446,920 A | 5/1969 | Zuekr | |
| 3,513,309 A | 5/1970 | Hehemann | |
| 3,548,314 A | 12/1970 | Mitchell | |
| 3,558,936 A | 1/1971 | Horan | |
| 3,614,486 A | 10/1971 | Smiley | |
| 3,649,857 A | * | 3/1972 | Knappe .................. 310/323.17 |
| 3,666,975 A | 5/1972 | Balamuth | .................. 310/8.2 |
| 3,731,214 A | 5/1973 | Bers | |

(List continued on next page.)

FOREIGN PATENT DOCUMENTS

| | | |
|---|---|---|
| DE | 4220177 | 7/1994 |
| DE | 19946003 | 5/2000 |
| DE | 19946838 | 10/2000 |
| EP | 0 704 916 A1 | 11/1995 |
| JP | 61-150287 | 7/1986 |
| JP | 62-23381 | 1/1987 |
| JP | 62-217880 | 9/1987 |
| JP | 62217880 | 9/1987 |
| JP | 1-152976 | 6/1989 |
| JP | 2-260476 | 10/1990 |
| JP | 3234981 | 10/1991 |
| JP | 4-165966 | 11/1992 |
| JP | 5-305574 | 11/1993 |
| JP | 6105568 | 4/1994 |
| JP | 6-105568 | 4/1994 |
| JP | 7-236287 | 5/1995 |
| JP | 8093944 | 4/1996 |
| WO | WO 98/23868 | 11/1997 |

OTHER PUBLICATIONS

US 5,877,442, 3/1999, Freeland et al. (withdrawn)

Primary Examiner—Thomas M. Dougherty
Assistant Examiner—Karen Addison
(74) Attorney, Agent, or Firm—Young & Basile, P.C.

(57) ABSTRACT

An apparatus for use in an application including at least one of clamping and valving. The apparatus includes a support structure and actuator means for operating the support structure between a rest position and an actuated position. In one embodiment, the actuator means is a piezoelectric device and the support structure is a single piece which is a mechanically active element of the apparatus.

18 Claims, 4 Drawing Sheets

U.S. PATENT DOCUMENTS

| | | |
|---|---|---|
| 3,749,946 A | 7/1973 | Von Ruti |
| 3,902,084 A | 8/1975 | May, Jr. |
| 3,902,085 A | 8/1975 | Bizzigotti |
| 4,009,447 A | 2/1977 | Wolf et al. |
| 4,018,124 A | 4/1977 | Rosado ................ 84/1.16 |
| 4,044,239 A | 8/1977 | Shimauchi et al. ...... 235/151.3 |
| 4,088,052 A | 5/1978 | Hedrick ................ 84/454 |
| 4,088,916 A | 5/1978 | Weineck et al. |
| 4,112,879 A | 9/1978 | Assenheimer et al. |
| 4,157,802 A | 6/1979 | May, Jr. |
| 4,193,703 A * | 3/1980 | Sakmann ........... 400/124.16 |
| 4,196,652 A | 4/1980 | Raskin ................ 84/458 |
| 4,207,791 A | 6/1980 | Murakami ............ 84/1.01 |
| 4,208,636 A | 6/1980 | German |
| 4,214,215 A | 7/1980 | Mellen et al. |
| 4,228,680 A | 10/1980 | Engel et al. |
| 4,287,582 A | 9/1981 | Tocquet |
| 4,313,023 A * | 1/1982 | Stephens ............ 136/246 |
| 4,313,361 A | 2/1982 | Deutsch .............. 84/1.01 |
| 4,318,023 A | 3/1982 | O'Neill et al. |
| 4,319,843 A | 3/1982 | Gornall |
| 4,327,623 A | 5/1982 | Mochida et al. ........ 84/454 |
| 4,336,809 A | 6/1982 | Clark |
| 4,388,908 A | 6/1983 | Babitzka et al. |
| 4,426,907 A | 1/1984 | Scholz ................ 84/454 |
| 4,426,981 A | 1/1984 | Greiner et al. |
| 4,430,899 A | 2/1984 | Wessel |
| 4,432,228 A | 2/1984 | Kuschmierz et al. |
| 4,434,753 A | 3/1984 | Mukainakano et al. |
| 4,435,666 A * | 3/1984 | Fukui et al. ............ 310/328 |
| 4,460,840 A * | 7/1984 | Weiger et al. .......... 310/328 |
| 4,463,727 A | 8/1984 | Babitzka et al. |
| 4,468,583 A | 8/1984 | Mori |
| 4,479,475 A | 10/1984 | Babitzka |
| 4,570,095 A * | 2/1986 | Uchikawa ............ 310/328 |
| 4,570,096 A | 2/1986 | Hara et al. |
| 4,580,540 A | 4/1986 | Babitzka et al. |
| 4,584,923 A | 4/1986 | Minnick ............ 84/454 |
| 4,612,440 A | 9/1986 | Brunnee et al. |
| 4,617,952 A | 10/1986 | Fujiwara et al. |
| 4,629,039 A | 12/1986 | Imoto et al. |
| 4,629,926 A | 12/1986 | Siegal |
| 4,647,808 A | 3/1987 | Shibuya |
| 4,660,523 A | 4/1987 | Brauer et al. |
| 4,667,639 A | 5/1987 | Linder et al. |
| 4,675,568 A | 6/1987 | Uchikawa et al. |
| 4,697,118 A | 9/1987 | Harnden, Jr. et al. |
| 4,703,215 A | 10/1987 | Asano |
| 4,714,855 A | 12/1987 | Fujimoto |
| 4,725,002 A | 2/1988 | Trachte |
| 4,732,071 A | 3/1988 | Deutsch ................ 84/454 |
| 4,735,185 A | 4/1988 | Imoto et al. |
| 4,736,131 A | 4/1988 | Fujimoto |
| 4,749,897 A | 6/1988 | Natsume et al. |
| 4,750,706 A | 6/1988 | Schlagmüller |
| 4,757,223 A | 7/1988 | Ueyama |
| 4,769,569 A | 9/1988 | Stahlhuth |
| 4,777,398 A | 10/1988 | Shibuya |
| 4,783,610 A | 11/1988 | Asano |
| 4,793,313 A | 12/1988 | Paganon et al. |
| 4,803,908 A | 2/1989 | Skinn et al. ............ 84/454 |
| 4,808,874 A | 2/1989 | Stahlhuth |
| 4,816,713 A | 3/1989 | Change, Jr. |
| 4,821,726 A | 4/1989 | Tamura et al. |
| 4,835,747 A | 5/1989 | Billet |
| 4,838,233 A | 6/1989 | Hayashi et al. |
| 4,847,193 A | 7/1989 | Richards et al. |
| 4,857,791 A | 8/1989 | Uchino et al. |
| 4,874,978 A | 10/1989 | Sakaida et al. |
| 4,874,979 A | 10/1989 | Rapp |
| 4,874,980 A | 10/1989 | Mine et al. |
| 4,893,750 A | 1/1990 | Haworth et al. |
| 4,909,126 A | 3/1990 | Skinn et al. ............ 84/454 |
| 4,929,859 A | 5/1990 | Suzuki et al. |
| 4,933,591 A | 6/1990 | Stahlhuth |
| 4,937,489 A | 6/1990 | Hattori et al. |
| 4,940,037 A | 7/1990 | Eckert |
| 4,947,077 A | 8/1990 | Murata |
| 4,979,275 A | 12/1990 | Sakaida et al. |
| 4,999,284 A | 3/1991 | Ward et al. |
| 5,004,946 A | 4/1991 | Sakaida et al. |
| 5,009,142 A | 4/1991 | Kurtz ................ 84/454 |
| 5,027,027 A | 6/1991 | Orbach et al. |
| 5,028,834 A | 7/1991 | Sakaida et al. |
| 5,034,647 A | 7/1991 | Ohtsuka |
| 5,038,657 A | 8/1991 | Busley ................ 84/455 |
| 5,040,514 A | 8/1991 | Kubach |
| 5,063,542 A | 11/1991 | Petermann et al. |
| 5,065,660 A | 11/1991 | de Buda ................ 84/200 |
| 5,072,288 A | 12/1991 | MacDonald et al. |
| 5,078,241 A | 1/1992 | Ackermann et al. |
| 5,080,079 A | 1/1992 | Yoshida et al. |
| 5,094,429 A | 3/1992 | Dostert |
| 5,109,885 A | 5/1992 | Tauscher |
| 5,115,880 A | 5/1992 | Sallas et al. |
| 5,157,256 A | 10/1992 | Aaron |
| 5,161,774 A | 11/1992 | Engelsdorf et al. |
| 5,182,484 A | 1/1993 | Culp |
| 5,191,252 A | 3/1993 | Sano |
| 5,199,641 A | 4/1993 | Hohm et al. |
| 5,205,147 A | 4/1993 | Wada et al. |
| 5,237,238 A | 8/1993 | Berghaus et al. |
| 5,239,904 A | 8/1993 | Yamaguchi et al. |
| 5,270,984 A | 12/1993 | Mine |
| 5,314,175 A | 5/1994 | Izumi et al. |
| 5,319,257 A | 6/1994 | McIntyre |
| 5,323,680 A | 6/1994 | Miller et al. ............ 84/455 |
| 5,328,149 A | 7/1994 | Reuter |
| 5,332,942 A | 7/1994 | Rennex |
| 5,335,862 A | 8/1994 | Esper |
| 5,343,793 A | 9/1994 | Pattie ................ 84/454 |
| RE34,823 E | 1/1995 | Sakaida et al. |
| 5,390,579 A | 2/1995 | Burgon ................ 84/454 |
| 5,410,206 A | 4/1995 | Luecke et al. ............ 310/328 |
| 5,410,207 A | 4/1995 | Miura et al. |
| 5,413,076 A | 5/1995 | Koenigswieser et al. |
| 5,425,343 A | 6/1995 | Akaki et al. |
| 5,435,477 A | 7/1995 | Torihata et al. |
| 5,444,324 A | 8/1995 | Priest et al. |
| 5,460,202 A | 10/1995 | Hanley et al. |
| 5,465,021 A | 11/1995 | Visscher et al. |
| 5,477,831 A | 12/1995 | Akaki et al. |
| 5,479,064 A | 12/1995 | Sano |
| 5,482,213 A | 1/1996 | Matsusaka et al. |
| 5,500,777 A | 3/1996 | Hasegawa et al. |
| 5,501,986 A | 3/1996 | Ward et al. |
| 5,518,184 A | 5/1996 | Potz et al. |
| 5,645,226 A | 7/1997 | Bright |
| 5,685,485 A | 11/1997 | Mock et al. |
| 5,697,554 A | 12/1997 | Auwaerter et al. |
| 5,712,524 A | 1/1998 | Suga |
| 5,751,090 A | 5/1998 | Henderson |
| 5,779,149 A | 7/1998 | Hayes, Jr. |
| 5,780,759 A | 7/1998 | Szalay ................ 84/454 |
| 5,780,956 A | 7/1998 | Oliver et al. ............ 310/323 |
| 5,780,957 A | 7/1998 | Oliver et al. |
| 5,803,370 A | 9/1998 | Heinz et al. |
| 5,810,255 A | 9/1998 | Itoh et al. |
| 5,824,929 A | 10/1998 | Freeland et al. ............ 84/454 |
| 5,824,937 A | 10/1998 | Szalay |
| 5,831,264 A | 11/1998 | Shedd et al. |

| | | | | | | |
|---|---|---|---|---|---|---|
| 5,847,387 A | 12/1998 | Shedd et al. | | 6,021,760 A | 2/2000 | Boecking |
| 5,859,378 A | 1/1999 | Freeland et al. ............... 84/454 | | 6,025,671 A | 2/2000 | Boecking |
| 5,859,561 A | 1/1999 | Vanoli | | 6,035,722 A | 3/2000 | Giersch et al. |
| 5,875,764 A | 3/1999 | Kappel et al. | | 6,040,643 A | 3/2000 | Bruns |
| 5,881,767 A | 3/1999 | Löser | | 6,060,814 A | 5/2000 | Hoffman et al. |
| 5,883,323 A | 3/1999 | Kaufman ..................... 84/454 | | 6,062,533 A | 5/2000 | Kappel et al. |
| 5,886,270 A | 3/1999 | Wynn ......................... 84/313 | | 6,104,125 A | 8/2000 | Pan et al. |
| 5,901,896 A | 5/1999 | Gal | | 6,131,879 A | 10/2000 | Kluge et al. |
| 5,907,211 A | 5/1999 | Hall et al. | | 6,166,307 A | 12/2000 | Caulkins et al. ................ 84/50 |
| 5,907,212 A | 5/1999 | Okada | | 6,246,157 B1 | 6/2001 | Oliver et al. |
| 5,907,269 A | 5/1999 | Zrostlik | | 6,246,287 B1 | 6/2001 | Yamashita |
| 5,934,976 A | 8/1999 | Makino et al. | | 6,291,928 B1 | 9/2001 | Lazarus et al. |
| 5,946,969 A | 9/1999 | Munekata et al. | | 6,294,859 B1 | 9/2001 | Jaenker |
| 5,975,428 A | 11/1999 | Potschin et al. | | 6,411,009 B2 | 6/2002 | Jaenker |
| 5,977,467 A | 11/1999 | Freeland et al. .............. 84/454 | | | | |
| 6,003,836 A | 12/1999 | Cewers | | | | |
| 6,016,040 A | 1/2000 | Hoffmann et al. | | * cited by examiner | | |

APPARATUS HAVING A SUPPORT STRUCTURE AND ACTUATOR

CROSS-REFERENCE TO RELATED APPLICATIONS

This application claims the benefit of U.S. Provisional Application No. 60/198,056, filed Apr. 18, 2000, and U.S. Provisional Application No. 60/220,542, filed Jul. 25, 2000. This application is related to U.S. patent application Ser. No. 09/771,533 filed on Jan. 29, 2001.

FIELD OF THE INVENTION

The present invention relates to an apparatus for use in an application including at least one of clamping and valving.

BACKGROUND OF THE INVENTION

Known clamping and valving mechanisms include solenoids as well as piezoelectric clamps and valves. Such known clamping and valving mechanisms have several shortcomings. Solenoids require a number of components and, thus, are expensive and prone to failure. Known clamps and valves operated with piezoelectric actuators have complex designs which can not provide the performance required for many applications. More specifically, such piezoelectric clamps and valves do not provide the necessary opening displacement and/or clamping force.

SUMMARY OF THE INVENTION

An apparatus for use in an application including at least one of clamping and valving. The apparatus includes a support structure and actuator means for operating the support structure between a rest position and an actuated position. In one embodiment, the actuator means is a piezoelectric device and the support structure is a single piece which is a mechanically active element of the apparatus.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
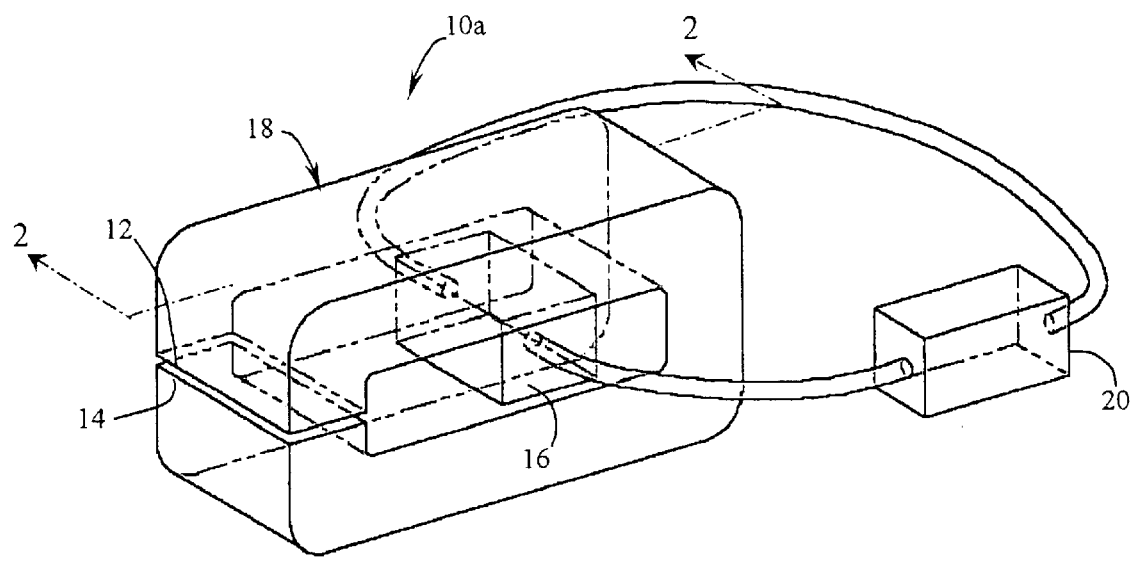
FIG. 1 is a perspective view of a first embodiment of an apparatus in accordance with the present invention.

FIGS. 1–8 illustrate several embodiments of an apparatus 10a in accordance with the present invention for use in a clamping and/or valving application. Each apparatus 10a includes at least one pair of opposing surfaces 12 and 14 and an actuator means 16. The opposing surfaces 12 and 14 are formed on a support structure 18 for movement relative to one another. The actuator means 16 operably engages the support structure 18 for driving the opposing surfaces 12 and 14 relative to one another in response to an electrical activation from a controller 20 in communication with the actuator means 16.

When activated, the actuator means 16 is designed to produce a positional or spatial displacement along one predetermined axis. The function of the actuator means 16 may be performed by one of several different types of piezoelectric devices including an individual piezoelectric element, a stack of individual piezoelectric elements, a mechanically amplified piezoelectric element or stack, or a multilayer cofired piezoelectric stack.

Each type of piezoelectric device described above operates in substantially the same manner. The piezoelectric device can be (1) electrically charged using a voltage, or (2) electrically discharged using a controlled electrical ground or short.

When a voltage is applied across the piezoelectric device, the device receives and stores an electrical charge. When charged, the piezoelectric device expands along the one predetermined axis. The expansion of the piezoelectric device produces a spatial displacement along the one predetermined axis greater than the nominal thickness of the device.

The electrical charge on the piezoelectric device is discharged or dissipated when the device is electrically shorted or grounded, typically through an impedance. When discharged, the piezoelectric device contracts or shrinks along the one predetermined axis back toward the nominal thickness of the device. The controller 20 is designed to charge and discharge the piezoelectric device.

The support structure 18 includes first and second arm portions 22 and 24 and at least one web or fulcrum 26 extending transversely between the first and second arm portions 22 and 24. The opposing surfaces 12 and 14 are disposed at a first end 28 of the first and second arm portions 22 and 24 respectively. The support structure 18, including the web 26 and the first and second arm portions 22 and 24, is a unitary, integral, single-piece body.

The support structure 18 is composed of a material having shape memory. Typically, the support structure material has a high modulus of elasticity or resilience and high strength. As a result, the first and second arm portions 22 and 24 are resiliently biased to a rest position. The apparatus 10a can be made from a variety of materials including, but not limited to, a metal, such as steel or other metals, an alloy, such as Inconel or other alloys, or a composite material, such as Thornel.

When the actuator means 16 is electrically activated, the first and second arm portions 22 and 24 are driven from the rest position to an actuated position. The first and second arm portions 22 and 24 are constantly biased by the shape memory of the support structure material toward the rest position. When the actuator means 16 is deactivated, the shape memory or resilience of the support structure material returns the first and second arm portions 22 and 24 from the actuated position to the rest position provided the support structure 18 has not been plastically deformed. In this manner, the one-piece support structure 18 functions as a mechanically active element of the apparatus 10a by transferring and amplifying the spatial displacement of the actuator 16 to the opposing surfaces 12 and 14 to produce the clamping and/or valving operation.

Figure 2:
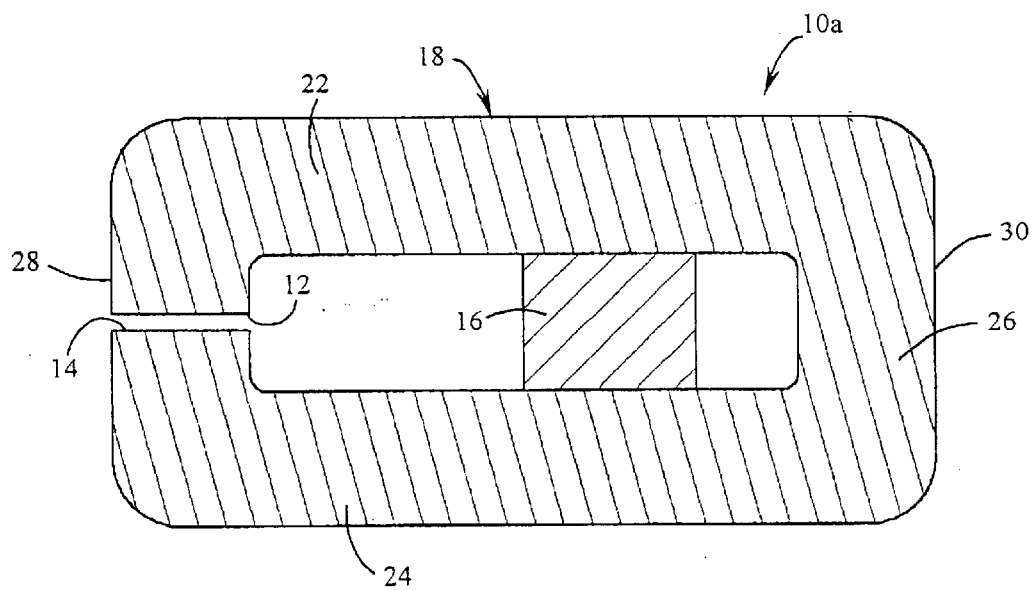
FIG. 2 is a cross-sectional view of the first embodiment of the apparatus taken along lines 2—2 in FIG. 1.

FIG. 1 is a perspective view of a first embodiment of the apparatus 10a in accordance with the present invention. FIG. 2 is a cross-sectional view of the first embodiment of the apparatus 10a taken along lines 2—2 in FIG. 1. In this embodiment, the web 26 extends between the first and second arm portions 22 and 24 at a second end 30 opposite the first end 28 establishing a substantially C-shaped cross-section. The actuator means 16 is operably engaged between the first and second arm portions 22 and 24. The opposing surfaces 12 and 14 are normally immediately or nearly adjacent to one another. In other words, the opposing surfaces 12 and 14 are closest to each other when the actuator 16 is deactivated. This type of configuration is commonly referred to as a normally closed design. When the actuator means 16 is electrically activated, the first and second arm portions 22 and 24 are driven away or apart from one another from a rest position to an actuated position. As a result, the space or distance between the opposing surfaces 12 and 14 is increased or, in other words, the opposing surfaces 12 and 14 are opened. The first and second arm portions 22 and 24 are constantly biased by the shape memory of the support structure material toward the rest position. Thus, when the actuator means 16 is deactivated, the first and second arm portions 22 and 24 return from the actuated position to the rest position. As a result, the space or distance between the opposing surfaces 12 and 14 is decreased or, in other words, the opposing surfaces 12 and 14 are closed. In this manner, the first embodiment of the apparatus 10a is particularly adapted to function as a normally closed clamp.

Figure 3:
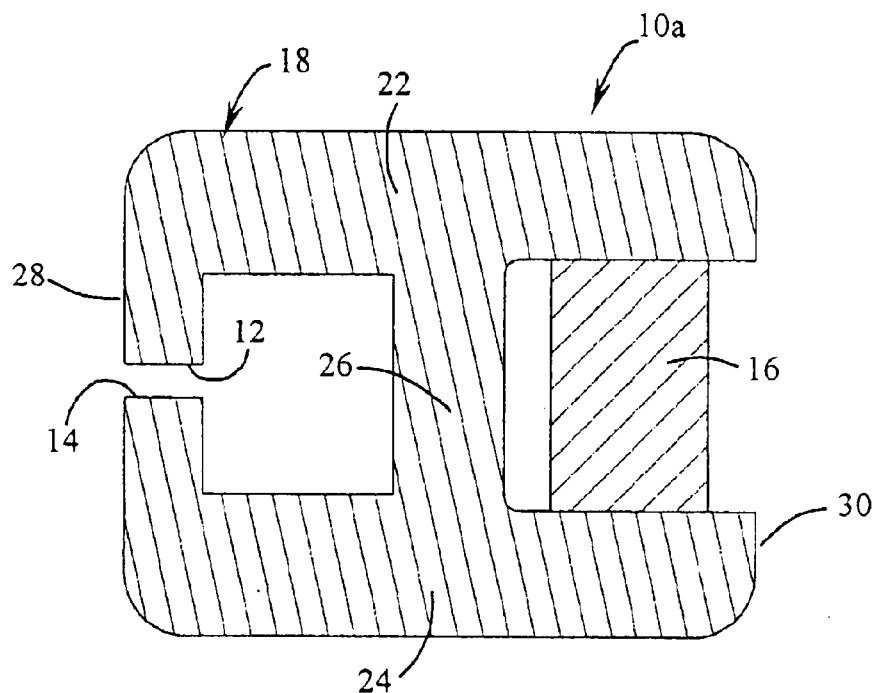
FIG. 3 is a cross-sectional view of a second embodiment of the apparatus.

FIG. 3 is a cross-sectional view of a second embodiment of the apparatus 10a. In this embodiment, the at least one web 26 extends between the first and second arm portions 22 and 24 at a position between or intermediate with respect to the first end 28 and the second end 30 establishing a substantially I-shaped cross-section. The actuator means 16 is operably engaged between the first and second arm portions 22 and 24. The opposing surfaces 12 and 14 are normally spaced from one another. In other words, the opposing surfaces 12 and 14 are furthest from each other when the actuator 16 is deactivated. This type of configuration is commonly referred to as a normally open design. When the actuator 16 is electrically activated, the second ends 30 of the first and second arms 22 and 24 are driven away or apart from one another and the first ends 28 of the first and second arms 22 and 24 are driven toward one another from a rest position to an actuated position. As a result, the space or distance between the opposing surfaces 12 and 14 is decreased or, in other words, the opposing surfaces 12 and 14 are closed. The first and second arm portions 22 and 24 are constantly biased by the shape memory of the support structure material toward the rest position. Thus, when the actuator 16 is deactivated, the first and second arm portions 22 and 24 return from the actuated position to the rest position. As a result, the space or distance between the opposing surfaces 12 and 14 is increased or, in other words, the opposing surfaces 12 and 14 are opened. In this manner, the second embodiment of the apparatus 10a is particularly adapted to function as a normally open clamp.

Figure 4:
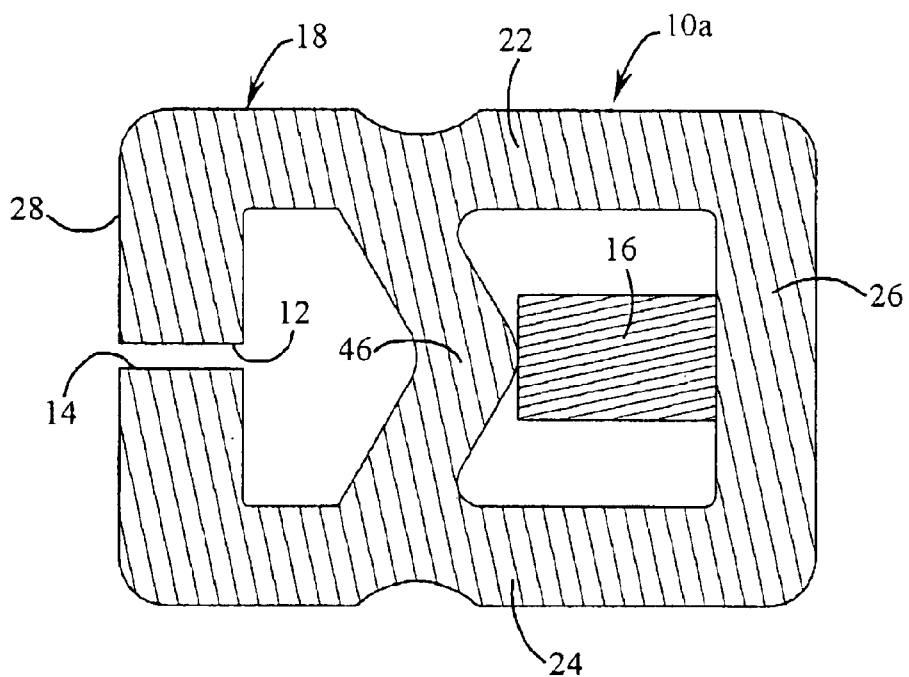
FIG. 4 is a cross-sectional view of a third embodiment of the apparatus.

FIG. 4 is a cross-sectional view of a third embodiment of the apparatus 10a wherein the support structure 18 further includes a second web 46. The second web 46 extends between the first and second arm portions 22 and 24 at a position between or intermediate with respect to the first end 28 and the first web 26. The actuator 16 is operably engaged between the first and second webs 26 and 46. More specifically, the actuator 16 is operably engaged between the first web 26 and the portion of the second web 46 which is closest or proximate to the first web 26. The second non-planar web 46 is shaped with respect to the first web 26 and the first and second arm portions 22 and 24 such that the first and second arm portions 22 and 24 are driven away or apart from one another in response to an electrical activation of the actuator 16. When the actuator means 16 is electrically activated, the first web 26 and the proximate portion of the second web 46 are driven away or apart from one another driving the non-planar second web 46 toward a planar shape. The driving of the second web 46 toward a planar shape drives the first and second arm portions 22 and 24 away or apart from one another from a rest position to an actuated position. As a result, the space or distance between the opposing surfaces 12 and 14 is increased or, in other words, the opposing surfaces 12 and 14 are opened. The first and second arm portions 22 and 24 are constantly biased by the shape memory of the support structure 18 material toward the rest position. Thus, when the actuator 16 is deactivated, the first and second webs 26 and 46 move toward each other and the first and second arm portions 22 and 24 return from the actuated position to the rest position. As a result, the space or distance between the opposing surfaces 12 and 14 is decreased or, in other words, the opposing surfaces 12 and 14 are closed. In this manner, the third embodiment of the apparatus 10a is particularly adapted to function as a normally open clamp.

Figure 5:
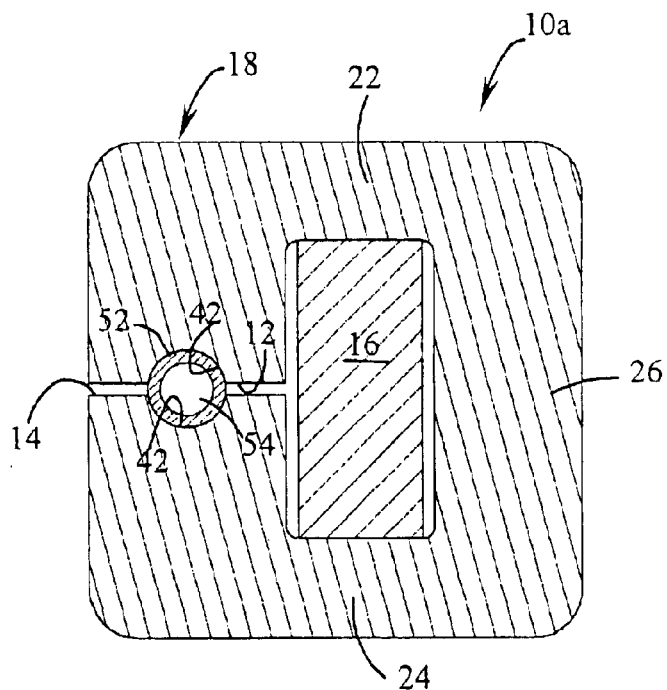
FIG. 5 is a cross-sectional view of a fourth embodiment of the apparatus.

FIG. 5 is a cross-sectional view of a fourth embodiment of the apparatus 10a. In this embodiment, the at least one of the pair of opposing surfaces 12 or 14 includes a shaped recess 42 complementary with respect to a flexible article 52 to be engaged between the opposing surfaces 12 and 14. The flexible article 52 has a fluid flow passageway 54 extending therethrough. The actuator means 16 is operably engaged between the first and second arm portions 22 and 24. The opening and closing of the opposing surfaces 12 and 14 causes a change in a cross-sectional area of the fluid flow passageway 54 when the actuator 16 is electrically activated and deactivated respectively. The opposing surfaces 12 and 14 are normally immediately or nearly adjacent to one another. As a result, the cross-sectional area of the fluid flow passageway 54 is normally relatively small or zero. In other words, the fluid flow passageway 54 is normally significantly restricted or completely closed. When the actuator 16 is electrically activated, the first and second arm portions 22 and 24 are driven away or apart from one another from a rest position to an actuated position as illustrated in FIG. 5. As a result, the space or distance between the opposing surfaces 12 and 14 is increased, enlarging the cross-sectional area of the fluid flow passageway 54. The first and second arm portions 22 and 24 are constantly biased by the shape memory of the support structure material toward the rest position. Thus, when the actuator 16 is deactivated, the opposing surfaces 12 and 14 are biased toward one another by the shape memory of the support structure material. As a result, the cross-sectional area of the fluid flow passageway 54 is reduced back towards the initial zero or relatively small size. As a result, the fluid flow passageway 54 is significantly restricted or completely closed. In this manner, the fourth embodiment of the apparatus 10a is particularly adapted to function as a pinch valve.

Figure 6:
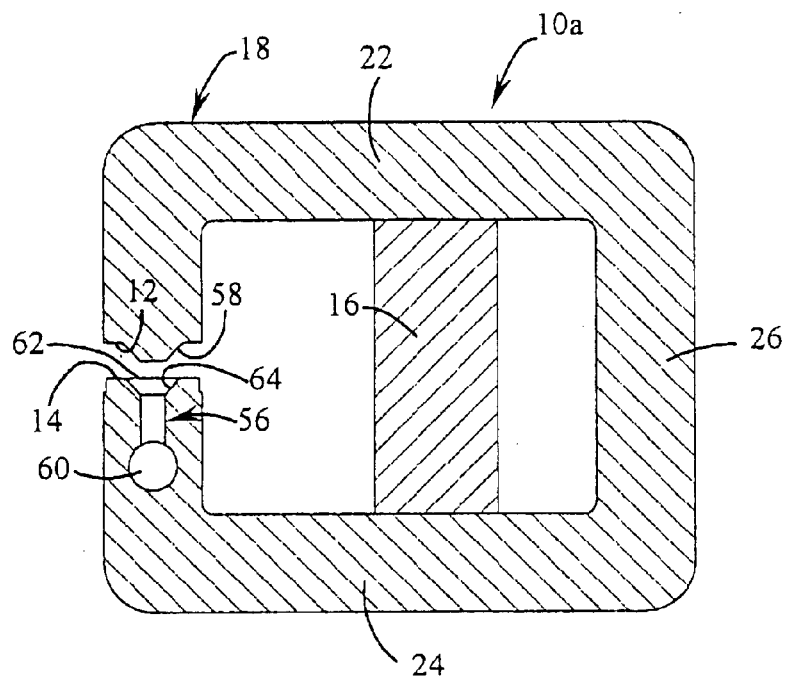
FIG. 6 is a cross-sectional view of a fifth embodiment of the apparatus.

FIG. 6 is a cross-sectional view of a fifth embodiment of the apparatus 10a. In this embodiment, the support structure 18 includes a fluid flow passageway 56 and a valve surface 58. The fluid flow passageway 56 extends through at least a portion of the support structure 18 and defines an inlet 60, an outlet 62, and a valve seat 64 disposed within the passageway 56 and positioned with respect to one opposing surface 14. The valve surface 58 is supported with respect to the other opposing surface 12 for regulating fluid flow through the passageway 56 at the valve seat 64 in response to an electrical activation of the actuator 16. In this embodiment, the valve seat 64 is disposed immediately adjacent to the one opposing surface 14 and the valve surface 58 is supported to extend from the other opposing surface 12 in alignment with the valve seat 64. The actuator means 16 is operably engaged between the first and second arm portions 22 and 24. The opposing surfaces 12 and 14 are normally immediately adjacent to one another or, in other words, closed. As a result, the valve surface 58 is normally sealingly engaged with the valve seat 64. In other words, fluid flow through the passageway 56 at the valve seat 64 is normally significantly restricted or completely blocked. In this manner, the apparatus 10a operates as a normally closed valve. When the actuator 16 is electrically activated, the first and second arm portions 22 and 24 are driven away or apart from one another from a rest position to an actuated position as illustrated in FIG. 6. As a result, the space or distance between the opposing surfaces 12 and 14 is increased, separating the valve surface 58 from the valve seat 64 of the passageway 56. The first and second arm portions 22 and 24 are constantly biased by the shape memory of the support structure material toward the rest position. Thus, when the actuator 16 is deactivated, the first and second arm portions 22 and 24 return from the actuated position to the rest position. As a result, the valve surface 58 is moved toward the valve seat 64 of the passageway 56 and fluid flow through the passageway 56 at the valve seat 64 is restricted or completely blocked. In this manner, the fifth embodiment of the apparatus 10a is particularly adapted to function as one of several types of valves, such as a needle valve or face seal valve.

Figure 7:
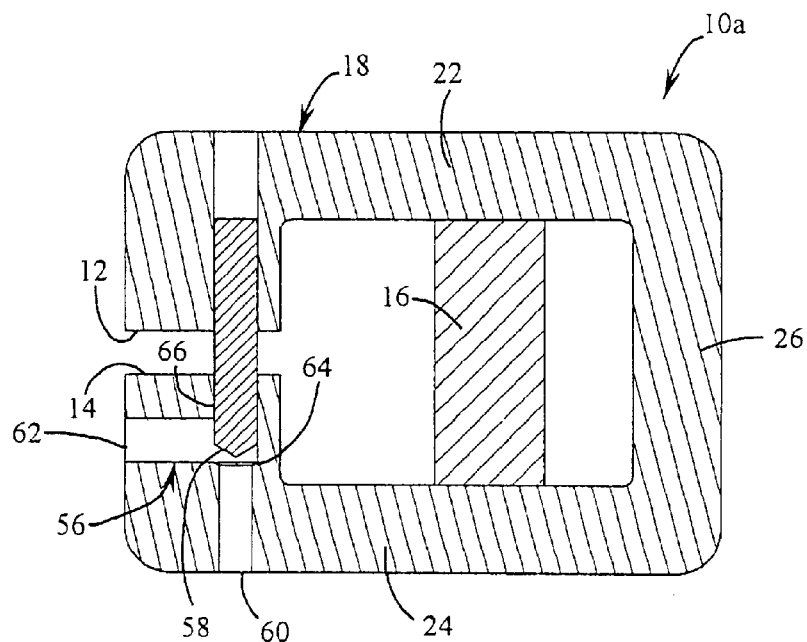
FIG. 7 is a cross-sectional view of a sixth embodiment of the apparatus.

FIG. 7 is a cross-sectional view of a sixth embodiment of the apparatus 10a. In this embodiment, the support structure 18 includes a fluid flow passageway 56 and a valve surface 58. The fluid flow passageway 56 extends through at least a portion of the support structure 18 and defines an inlet 60, an outlet 62, and a valve seat 64 disposed within the passageway 56 and positioned with respect to one opposing surface 14. The valve surface 58 is supported with respect to the other opposing surface 12 for regulating fluid flow through the passageway 56 at the valve seat 64 in response to an electrical activation of the actuator 16. In this embodiment, the valve surface 58 is supported to extend from the other opposing surface 12, the valve seat 64 is spaced from the one opposing surface 14, and the passageway 56 further includes a valve surface passage 66 extending between the one opposing surface 14 and the valve seat 64 in alignment with the valve surface 58. The actuator means 16 is operably engaged between the first and second arm portions 22 and 24. The opposing surfaces 12 and 14 are normally immediately or nearly adjacent to one another or, in other words, closed. As a result, the valve surface 58 is normally sealingly engaged with the valve seat 64. In other words, fluid flow through the passageway 56 at the valve seat 64 is normally significantly restricted or completely blocked. In this manner, the apparatus 10a operates as a normally closed clamp. When the actuator 16 is electrically activated, the first and second arms 22 and 24 are driven away or apart from one another from a rest position to an actuated position as illustrated in FIG. 7. As a result, the space or distance between the opposing surfaces 12 and 14 is increased separating the valve surface 58 from the valve seat 64 of the passageway 56. The first and second arm portions 22 and 24 are constantly biased by the shape memory of the support structure material toward the rest position. Thus, when the actuator 16 is deactivated, the first and second arm portions 22 and 24 return from the actuated position to the rest position. As a result, the valve surface 58 and the valve seat 64 of the passageway 56 are biased back toward each other and fluid flow through the passageway 56 at the valve seat 64 is restricted or completely blocked. In this manner, the sixth embodiment of the apparatus 10a is particularly adapted to function as one of several types of valves, such as a needle valve or face seal valve.

Figure 8:
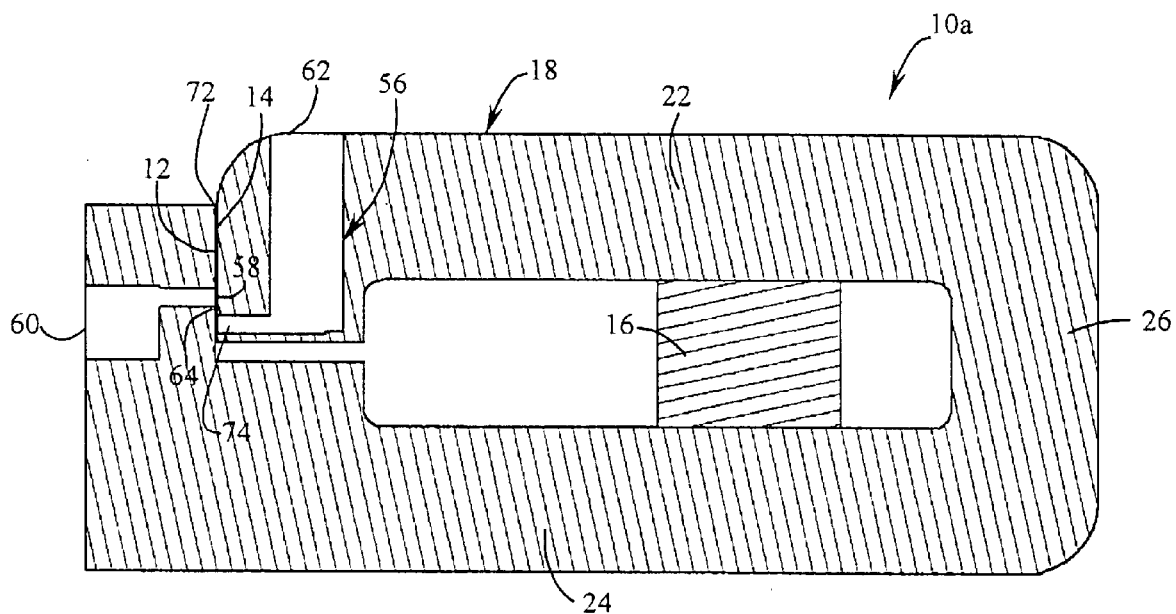
FIG. 8 is a cross-sectional view of a seventh embodiment of the apparatus.

FIG. 8 is a cross-sectional view of a seventh embodiment of the apparatus 10a. In this embodiment, the support structure 18 includes a fluid flow passageway 56 and a valve surface 58. The fluid flow passageway 56 extends through at least a portion of the support structure 18 and defines an inlet 60, an outlet 62, and a valve seat 64 disposed within the passageway 56 and positioned with respect to one opposing surface 12. The valve surface 58 is supported with respect to the other opposing surface 14 for regulating fluid flow through the passageway 56 at the valve seat 64 in response to an electrical activation of the actuator 16. In this embodiment, the pair of opposing surfaces 12 and 14 are operably disposed in sliding contact with one another along a parting line 72 defined therebetween, the valve seat 64 is disposed at the one opposing surface 12, and the valve surface 58 is disposed at the other opposing surface 14. The valve surface 58 is normally aligned with respect to the valve seat 64 as illustrated in FIG. 8. As a result, the valve surface 58 is normally sealingly engaged with the valve seat 64. In other words, fluid flow through the passageway 56 at the valve seat 64 is normally significantly restricted or completely blocked. When the actuator 16 is electrically activated, the first and second arms 22 and 24 are driven away or apart from one another from a rest position to an actuated position. In this manner, the opposing surfaces 12 and 14 are moved or slid in opposite directions aligning the valve seat 64 and a complementary portion 74 of the passageway 56.

When the actuator 16 is deactivated, both the first and second arms 22 and 24 are biased toward one another by the shape memory of the support structure material provided the support structure 18 has not been plastically deformed. As a result, the valve surface 58 and the valve seat 64 of the passageway 56 are biased back toward alignment with each other. As a result, fluid flow through the passageway 56 at the valve seat 64 is restricted or completely blocked. In this manner, the seventh embodiment of the apparatus 10a is particularly adapted to function as a gate valve.

Within the scope of the present invention, the embodiments of the apparatus 10a illustrated in FIGS. 7 and 8 may be operated as a valve to restrict fluid flow in the passageway from the inlet to the outlet or restrict fluid flow in the passageway from the outlet to the inlet.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for use in an application including at least one of clamping and valving, the apparatus comprising:

a support structure defining an at least substantially enclosed periphery of a support member, the support structure defining first and second inwardly directed opposing support surfaces facing one another, wherein the support structure is a generally I-shaped member; and actuator means located within the at least substantially enclosed periphery of the support member and operably positionable between the first and second inwardly directed opposing support surfaces for moving the support structure between a rest position and an actuated position in response to an excitation of the actuator means.

2. The apparatus of claim 1 wherein the actuator means is a piezoelectric device.

3. The apparatus of claim 2 wherein the support structure is a single piece.

4. The apparatus of claim 2 wherein the support structure is a mechanically active element of the apparatus.

5. The apparatus of claim 2 wherein the support structure includes opposing resilient arm portions biased to the rest position.

6. The apparatus of claim 5 wherein the arm portions are driven from the rest position to the actuated position in response to actuation of the actuator means.

7. The apparatus of claim 6 wherein the arm portions are biased to return to the rest position from the actuated position in response to deactuation of the actuator means.

8. The apparatus of claim 2 wherein the actuator means produces a spatial displacement when actuated and the support structure includes a pair of opposing arms disposed relative to the actuator for amplifying the spatial displacement.

9. In an apparatus for use in an application including at least one of clamping and valving having a support structure and piezoelectric actuator, the improvement comprising:

the support structure being a single piece of material having shape memory with a high modulus of elasticity and high strength, the support structure defining first and second opposing actuator-support surfaces facing one another and spaced apart from one another, the piezoelectric actuator operably positionable with opposite longitudinal ends engagable with the first and second opposing actuator-support surfaces for driving the support structure between a rest position and an actuated position in response to excitation of the piezoelectric actuator, wherein the support structure is a generally I-shaped member.

10. The improvement of claim 9 wherein the support structure is a mechanically active element of the apparatus.

11. The improvement of claim 9 wherein the support structure includes opposing resilient arm portions biased to a rest position.

12. The improvement of claim 11 wherein the arm portions are driven from the rest position to an actuated position in response to actuation of the actuator.

13. The improvement of claim 12 wherein the arm portions are biased to return to the rest position from the actuated position in response to deactuation of the actuator.

14. The improvement of claim 9 wherein the actuator produces a spatial displacement when actuated and the support structure includes a pair of opposing arms disposed relative to the actuator for amplifying the spatial displacement.

15. A apparatus for use in an application including at least one of clamping and valving, the apparatus comprising:

a generally I-shaped support structure including at least one web defining at least one flex axis with respect to the remaining support structure, the support structure defining first and second opposing support surfaces facing one another on one side of the at least one web and defining at least one rigid arm moveable about the flex axis on an opposite side of the at least one web; and actuator means operably positionable between the first and second opposing support surfaces for moving the at least one rigid arm of the support structure between a rest position and an actuated position in response to excitation of the actuator means.

16. The apparatus of claim 15 further comprising:

the at least one web of the support structure including first and second webs connected in one integral piece to at least one arm moveable relative to the remaining support structure about a flex axis when the actuator means is driven, wherein one of the webs includes a portion extending with an angled non-perpendicular component to the at least one arm; and the actuator means positionable between the first and second webs for driving the at least one arm relative to the remaining support structure when the actuator means is driven.

17. An apparatus for use in an application including at least one of clamping and valving, the apparatus comprising:

a support structure defining an at least substantially enclosed periphery of a support member, the support structure defining first and second inwardly directed opposing support surfaces facing one another, the support structure including first and second webs connected in one integral piece to at least one arm moveable relative to the remaining support structure about a flex axis, wherein one of the webs includes a portion extending with an angled non-perpendicular component to the at least one arm; and actuator means located within the at least substantially enclosed periphery of the support member and operably positionable between the first and second inwardly directed opposing support surfaces for moving the support structure between a rest position and an actuated position in response to an excitation of the actuator means, the actuator means positionable between the first and second webs for driving the at least one arm relative to the remaining support structure about the flex axis when the actuator means is driven.

18. In an apparatus for use in an application including at least one of clamping and valving having a support structure and piezoelectric actuator, the improvement comprising:

the support structure being a single piece of material having shape memory with a high modulus of elasticity and high strength, the support structure defining first and second opposing actuator-support surfaces facing one another and spaced apart from one another, the piezoelectric actuator operably positionable with opposite longitudinal ends engageable with the first and second opposing actuator-support surfaces for driving the support structure between a rest position and an actuated position in response to excitation of the piezoelectric actuator, the support structure including first and second webs connected in one integral piece to at least one arm moveable relative to the remaining support structure about a flex axis, wherein one of the webs includes a portion extending with an angled non-perpendicular component to the at least one arm; and the piezoelectric actuator positionable between the first and second webs for driving the at least one arm relative to the remaining support structure about the flex axis when the piezoelectric actuator is driven.

* * * * *